(12) United States Patent
Wang et al.

(10) Patent No.: US 7,924,508 B2
(45) Date of Patent: Apr. 12, 2011

(54) PROJECTION LENS AND PROJECTION SYSTEM HAVING SAME

(75) Inventors: Kuang-Ju Wang, Taipei Hsien (TW); Chun-Hsiang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/541,133

(22) Filed: Aug. 13, 2009

(65) Prior Publication Data

US 2010/0277815 A1 Nov. 4, 2010

(51) Int. Cl.
*G02B 9/00* (2006.01)
(52) U.S. Cl. .......................................... 359/651; 359/649
(58) Field of Classification Search .......... 359/649–651, 359/784, 793
See application file for complete search history.

(56) References Cited

U.S. PATENT DOCUMENTS 5,519,537 A * 5/1996 Shikama ....................... 359/649

FOREIGN PATENT DOCUMENTS

CN 101387736 A 3/2009

* cited by examiner

*Primary Examiner* — William C Choi
(74) *Attorney, Agent, or Firm* — Zhigang Ma

(57) ABSTRACT

A projection lens includes, in the order from a large conjugate side to a small conjugate side thereof, a negative lens group having a negative refractive power and a positive lens group having a positive refractive power. The positive lens group includes, in the order from the large conjugate side to the small conjugate side of the projection lens, a front sub-group and a rear sub-group each having a positive refractive power. The projection lens satisfies the formulas: $-1.35<F1/F<-0.35$ and $3<F24/F<5$, where F1, F24, and F correspondingly represent the effective focal lengths of the negative lens group, the rear sub-group, and the projection lens.

18 Claims, 4 Drawing Sheets

PROJECTION LENS AND PROJECTION SYSTEM HAVING SAME

BACKGROUND

1. Technical Field

The present disclosure relates to projection lenses and, particularly, to a projection lens having a high resolution and a wide field angle and a projection system having the same.

2. Description of Related Art

In order to obtain a large sharp projection image, projection lenses with a high resolution and a wide field angle are highly desirable for projectors, such as digital light processing (DLP) projectors, liquid crystal display (LCD) projectors, and liquid crystal on silicon (LCOS) projectors. However, correction of aberrations, especially field curvature, distortion, and coma, for acquiring a high resolution has been a challenge when configuring a projection lens having a wide field angle.

Therefore, it is desirable to provide a projection lens and a projection system having the same which can overcome the above-mentioned problems.

DETAILED DESCRIPTION

Embodiments of the present disclosure will now be described in detail with reference to the drawings.

Figure 1:
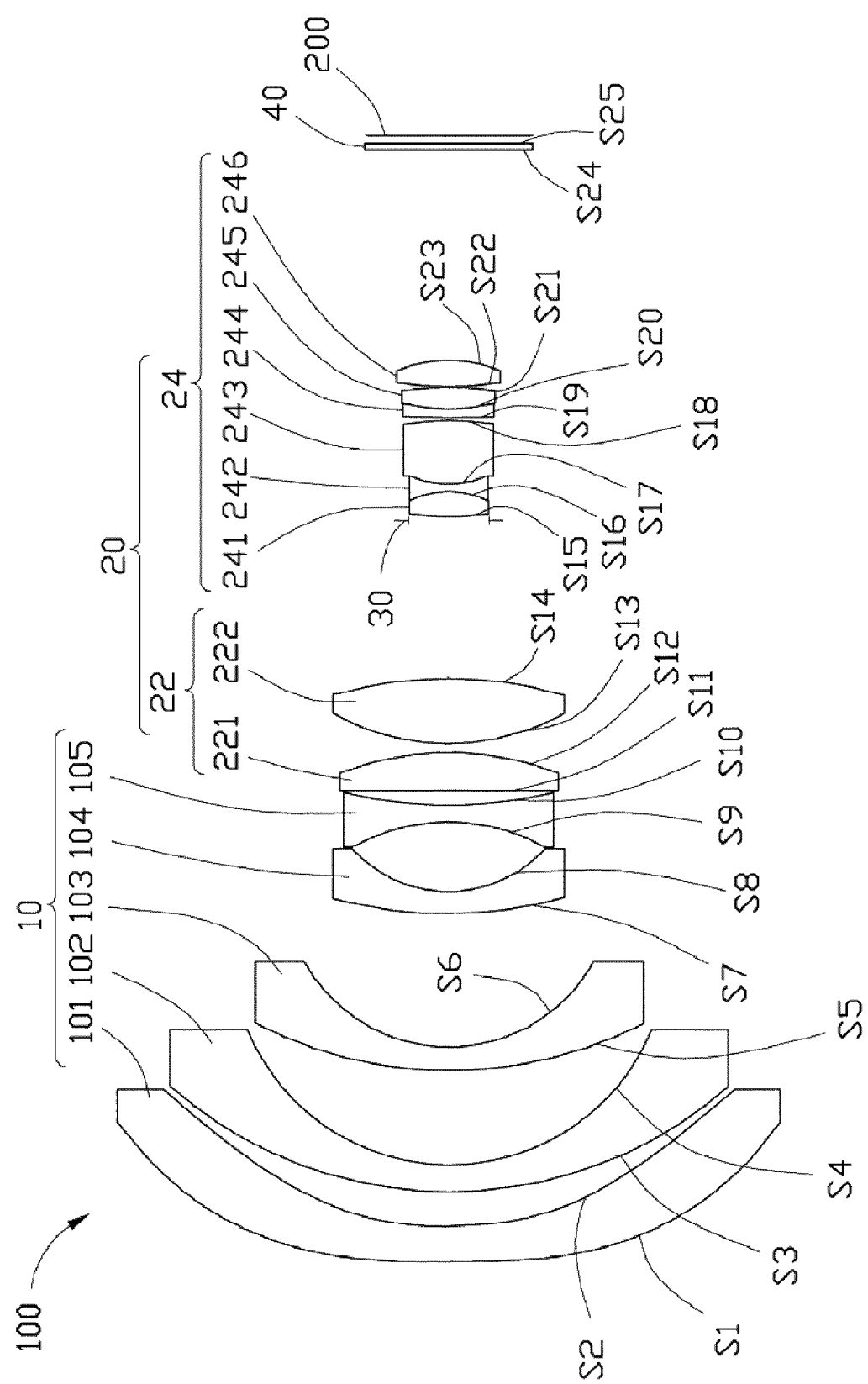
FIG. 1 is a schematic view of a projection lens, according to an exemplary embodiment.

Referring to FIG. 1, a projection lens 100, according to an exemplary embodiment, includes, in the order from a large conjugate side to a small conjugate side thereof, a negative lens group 10 and a positive lens group 20. The negative lens group 10 has a negative refractive power, while the positive lens group 20 has a positive refractive power. The projection lens 100 can be mounted in a body of a projection system (not shown) such as a DLP projector, and face a surface 200 of a spatial light modulator (SLM) of the DLP projector. Signal light from the SLM sequentially transmits through the positive lens group 20 and the negative lens group 10, and finally projects onto a screen (not shown), producing a magnified image.

Specifically, the negative lens group 10 includes, in the order from the large conjugate side to the small conjugate side of the projection lens 100, a first lens 101, a second lens 102, a third lens 103, a fourth lens 104, and a fifth lens 105. All of these lenses 101-105 each have a negative refractive power. In order to efficiently control aberrations caused by the negative lens group 10, at least one of the four lenses 101-104 has at least one aspherical surface (i.e., aspherical lens). In this embodiment, the first lens 101 is an aspherical lens with two aspherical surfaces S1 and S2.

The positive lens group 20 includes, in the order from the large conjugate side to the small conjugate side of the projection lens 100, a sixth lens 221, a seventh lens 222, an eighth lens 241, a ninth lens 242, a tenth lens 243, an eleventh lens 244, a twelfth lens 245, and a thirteenth lens 246. The sixth, seventh, eighth, tenth, twelfth, and thirteenth lenses 221, 222, 241, 243, 245, and 246 each have a positive refractive power. The ninth and eleventh lenses 242, and 244 each have a negative refractive power. The sixth lens 221 and the seventh lens 222 constitute a front sub-group 22 having a positive refractive power. The eighth, ninth, tenth, eleventh, twelfth, and thirteenth lenses 241-246 constitute a rear sub-group 24 having a positive refractive power. In this embodiment, the eighth, ninth, and tenth lenses 241-243 are glued together to form a first composite lens (not labeled) having a positive refractive power. The eleventh and twelfth lenses 244, 245 are glued together to form a second composite lens (not labeled) having a positive refractive power.

More specifically, the projection lens 100 further includes an aperture stop 30 interposed between the front sub-group 22 and the rear sub-group 24 and nearby the eighth lens 241. The aperture stop 30 is configured to block off-axis light rays from the rear sub-group 24 entering the front sub-group 22, and thereby prevent too much distortion occurring in the projection lens 100 (the off-axis light rays are the main cause of distortion).

The projection lens 100 satisfies the formulas: (1) $-1.35 < F1/F < -0.35$; and (2) $3 < F24/F < 5$, where F1, F24, and F correspondingly represent the effective focal lengths of the negative lens group 10, the rear sub-group 24, and the projection lens 100. The formulas (1) and (2) are adapted for distributing the refraction power of the negative lens group 10 and the rear sub-group 24 to control aberrations occurring in the projection lens 100 to be within an acceptable level. Furthermore, the formulas (1) and (2) ensure a wide field angle and a long rear focal length of the projection lens 100.

Also, the projection lens 100 satisfies the formula: (3) $BF/F > 4.5$, where BF is the rear focal length of the projection lens 100, i.e., the distance between the small conjugate side surface of the thirteenth lens 246 and the surface 200. This formula is for increasing the rear focal length BF to provide sufficient space to accommodate other optical devices between the thirteenth lens 246 and the surface 200. In this embodiment, a glass cover 40 is arranged between the thirteenth lens 246 and the surface 200 for protecting the surface 200.

Opportunely, the projection lens 100 also satisfies the formula: (4) $-0.15 < F/Ft < 0.1$, where Ft is a focus length of the first composite lens. This formula is for limiting the refraction power of the first composite lens to be in a proper range, such that aberrations occurring in the projection lens 100 are corrected to be within an acceptable level.

Opportunely, the projection lens 100 also satisfies the formula: (5) $n9 > 1.78$, where n9 is a refractive index of d line (wavelength: 587.6 nm) of the ninth lens 242. This formula ensures a high refractive index of the ninth lens 242 so as to ensure a good correction of higher-order aberrations occurring in the projection lens 100.

In the embodiment, the optical surfaces of all the lenses and the glass cover 40 are represented by symbols S1-S25, and S16, S17 and S20 represent the glued surfaces of the first and second composite lenses correspondingly. The aspherical surfaces S1 and S2 are shaped according to the formula:

$$x = \frac{ch^2}{1 + \sqrt{1 - (k+1)c^2 h^2}} + \sum A_i h^i$$

where h is a height from the optical axis of the projection lens 100 to the aspherical surface, c is a vertex curvature, k is a conic constant, and $A_i$ are i-th order correction coefficients of the aspherical surfaces.

Figure 2:
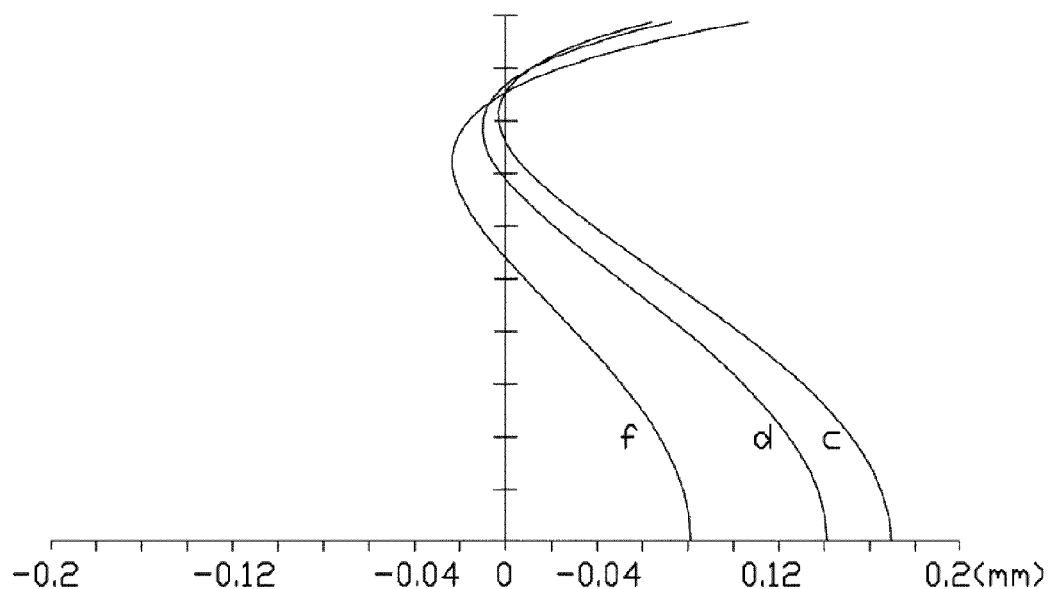
FIGS. 2-4 are graphs respectively showing spherical aberration, field curvature, and distortion occurring in the projection lens, according to an exemplary embodiment.
Figure 3:
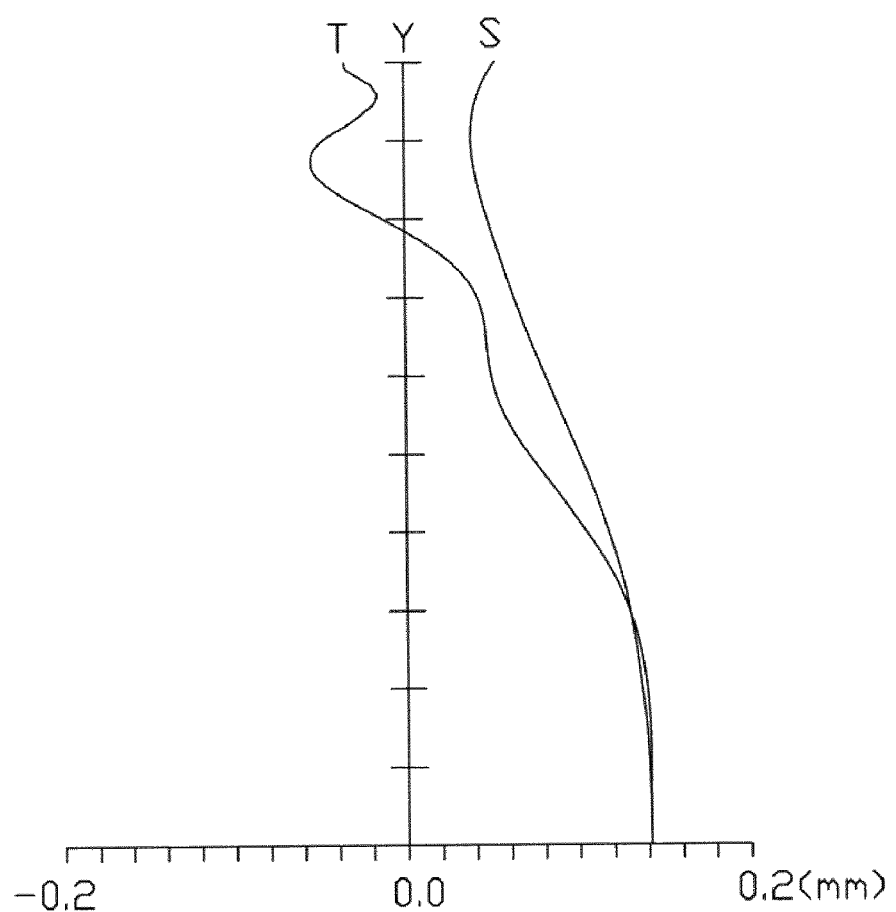
Figure 4:
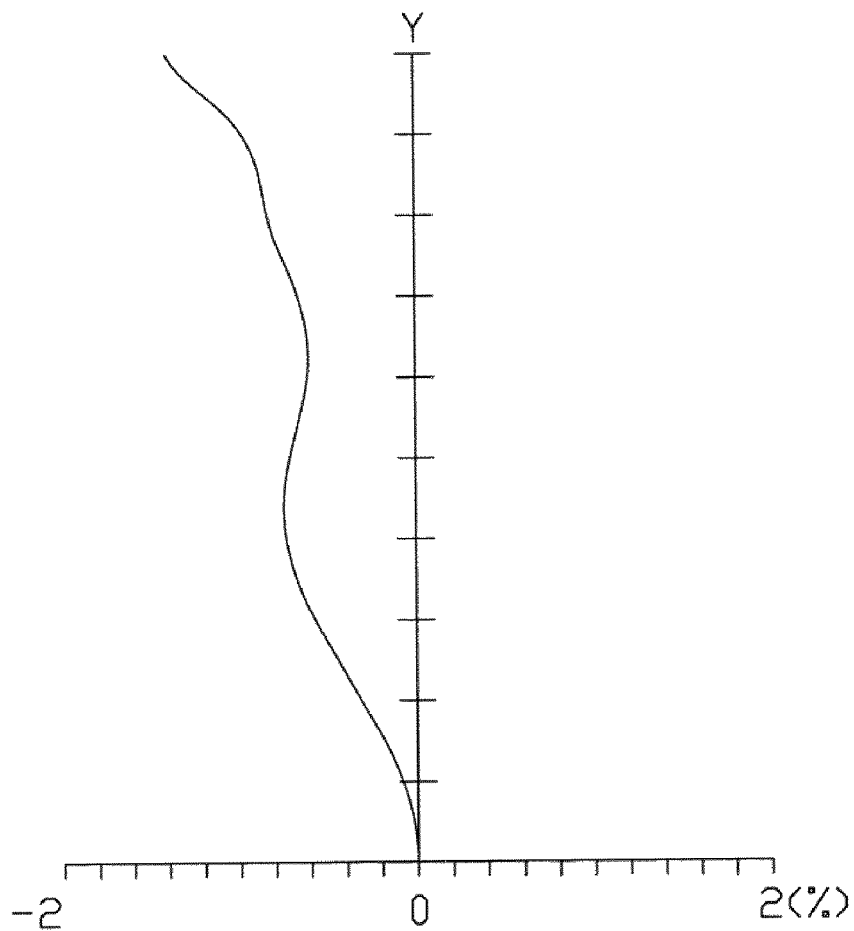

A detailed example of the projection lens 100 is given here with references to Tables 1-2 and FIGS. 2-4, but it should be noted that the projection lens 100 is not limited thereto. Following are the symbols used in the example:

$F_{No}$: F number;
2ω: field angle;
R: radius of curvature;
D: distance between surfaces on the optical axis of the projection lens 100;
Nd: refractive index of lens; and
Vd: Abbe constant.

EXAMPLE

Tables 1 and 2 show the lens data of the example, where 2ω=109.8°, $F_{NO.}$=2.35, F=7.42 mm, F1=−6.35 mm, F24=29.45 mm, Ft=−86.71 mm, BF=31.75 mm.

TABLE 1

| Surface | R (mm) | D (mm) | Nd | Vd |
|---|---|---|---|---|
| S1 | 249.568 | 5 | 1.525 | 55.951 |
| S2 | 52.506 | 4.91 | | |
| S3 | 60.66 | 4 | 1.620 | 36.259 |
| S4 | 31.395 | 13.14 | | |
| S5 | 58.75 | 3.5 | 1.589 | 61.253 |
| S6 | 23.883 | 19.08 | | |
| S7 | 68.864 | 3 | 1.589 | 61.253 |
| S8 | 18.876 | 9.81 | | |
| S9 | −28.726 | 2.2 | 1.497 | 81.608 |
| S10 | 55.919 | 2.33 | | |
| S11 | −1471.65 | 5.32 | 1.762 | 26.609 |
| S12 | −43.622 | 1.23 | | |
| S13 | 33.492 | 9.11 | 1.569 | 56.044 |
| S14 | −64.372 | 22.67 | | |
| Aperture stop | ∞ | 0.42 | | |
| S15 | 40.486 | 3.55 | 1.569 | 56.044 |
| S16 | −14.063 | 1.2 | 1.883 | 40.805 |
| S17 | 15.197 | 9 | 1.569 | 56.044 |
| S18 | −39.378 | 0.36 | | |
| S19 | 124.773 | 1.2 | 1.804 | 46.503 |
| S20 | 24.776 | 3.15 | 1.497 | 81.608 |
| S21 | −47.457 | 0.1 | | |
| S22 | 51.78 | 3.68 | 1.497 | 81.608 |
| S23 | −20.293 | 29.8275 | | |
| S24 | ∞ | 1.05 | 1.507 | 63.380 |
| S25 | ∞ | 1.1 | | |

TABLE 2

| Surface | k | A4 | A6 | A8 | A10 | A12 | A14 | A16 |
|---|---|---|---|---|---|---|---|---|
| S1 | 0 | 6.01E−6 | −3.09E−9 | 9.66E−13 | 3.41E−17 | −4.61E−20 | −2.72E−23 | 1.11E−26 |
| S2 | 0 | 3.80E−6 | −2.49E−9 | 2.60E−14 | −3.53E−16 | 3.39E−19 | −4.05E−23 | −1.12E−26 |

As illustrated in FIG. 2, the curves f, d, and c are respective spherical aberration characteristic curves of f light (wavelength: 486.1 nm), d light (587.6 nm), and c light (656.3 nm) occurring in the projection lens 100 of the example. Obviously, spherical aberration occurring in projection lens 100 of the example is in a range of −0.04 mm~0.18 mm. In FIG. 3, the curves T and S are the tangential field curvature curve and the sagittal field curvature curve respectively. Clearly, field curvature occurring in the projection lens 100 of the example is within a range of −0.06 mm~0.16 mm. In FIG. 4, distortion of d light occurring in the projection lens 100 of the example is within a range of −1.6%~0. In all, even though the projection lens 100 has a wide field angle (109.8°), the resolution of the projection lens 100 is maintained, even improved, since aberrations occurring in the projection lens 100 are controlled to be within an acceptable range.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A projection lens comprising, in the order from a large conjugate side to a small conjugate side thereof, a negative lens group having a negative refractive power and a positive lens group having a positive refractive power, the positive lens group comprising, in the order from the large conjugate side to the small conjugate side of the projection lens, a front sub-group and a rear sub-group each having a positive refractive power, wherein the projection lens satisfies the formulas: −1.35<F1/F<−0.35, 3<F24/F<5, and BF/F>4.5, where F1, F24, F, and BF correspondingly represent the effective focal lengths of the negative lens group, the rear sub-group, the projection lens, and the rear focal length of the projection lens.

2. The projection lens as claimed in claim 1, wherein the rear sub-group comprises a first composite lens comprising three lenses glued together, and the projection lens further satisfies the formula: −0.15<F/Ft<0.1, where Ft is a focus length of the first composite lens.

3. The projection lens as claimed in claim 2, wherein the first composite lens comprises a negative lens having a negative refractive power, and the projection lens further satisfies the formula: n9>1.78, where n9 is a refractive index of d line of the negative lens.

4. The projection lens as claimed in claim 1, wherein the negative lens group comprises, in the order from the large conjugate side to the small conjugate side of the projection lens, a first lens, a second lens, a third lens, a fourth lens, and a fifth lens each having a negative refractive power.

5. The projection lens as claimed in claim 4, wherein the first lens is an aspherical lens having two aspherical optical surfaces.

6. The projection lens as claimed in claim 4, wherein the front sub-group comprises, in the order from the large conjugate side to the small conjugate side of the projection lens, a sixth lens and a seventh lens each having a positive refractive power.

7. The projection lens as claimed in claim 6, wherein the rear sub-group comprises, in the order from the large conjugate side to the small conjugate side of the projection lens, an eighth lens, a ninth lens, a tenth lens, a eleventh lens, a twelfth lens, and a thirteenth lens;
the eighth lens, the ninth lens, and the tenth lens being glued together to form a first composite lens having a negative refractive power.

8. The projection lens as claimed in claim 7, wherein the eleventh lens and the twelfth lens are glued together to form a second composite lens having a negative refractive power.

9. The projection lens as claimed in claim 1, further comprising an aperture stop interposed between the front sub-group and the rear sub-group.

10. A projection system comprising:
a body;
a projection lens, mounted in the body, comprising, in the order from a large conjugate side to a small conjugate side thereof:
- a negative lens group having a negative refractive power; and
- a positive lens group having a negative refractive power and comprising, in the order from the large conjugate side to the small conjugate side of the projection lens:
  a front sub-group having a positive refractive power; and
  a rear sub-group having a positive refractive power, wherein the projection lens satisfies the formulas: $-1.35 < F1/F < -0.35$, $3 < F24/F < 5$, and $BF/F > 4.5$, where F1, F24, F, and BF correspondingly represent the effective focal lengths of the negative lens group, the rear sub-group, the projection lens, and the rear focal length of the projection lens; and
a spatial light modulator placed at the small conjugate side of the projection lens.

11. The projection system as claimed in claim 10, wherein the rear sub-group comprises a first composite lens comprising three lenses glued together, and the projection lens further satisfies the formula: $-0.15 < F/Ft < 0.1$, where Ft is a focus length of the first composite lens.

12. The projection system as claimed in claim 11, wherein the first composite lens comprises a negative lens having a negative refractive power, and the projection lens further satisfies the formula: $n9 > 1.78$, where n9 is a refractive index of d line of the negative lens.

13. The projection system as claimed in claim 10, wherein the negative lens group comprises, in the order from the large conjugate side to the small conjugate side of the projection lens, a first lens, a second lens, a third lens, a fourth lens, and a fifth lens each having a negative refractive power.

14. The projection system as claimed in claim 13, wherein the first lens is an aspherical lens having two aspherical optical surfaces.

15. The projection system as claimed in claim 13, wherein the front sub-group comprises, in the order from the large conjugate side to the small conjugate side of the projection lens, a sixth lens and a seventh lens each having a positive refractive power.

16. The projection system as claimed in claim 15, wherein the rear sub-group comprises, in the order from the large conjugate side to the small conjugate side of the projection lens, an eighth lens, a ninth lens, a tenth lens, a eleventh lens, a twelfth lens, and a thirteenth lens; the eighth lens, the ninth lens, and the tenth lens being glued together to form a first composite lens having a positive refractive power.

17. The projection system as claimed in claim 16, wherein the eleventh lens and the twelfth lens are glued together to form a second composite lens having a positive refractive power.

18. The projection system as claimed in claim 10, wherein the projection lens further comprises an aperture stop interposed between the front sub-group and the rear sub-group.

* * * * *